(12) United States Patent
Chin

(10) Patent No.: US 8,117,471 B2
(45) Date of Patent: Feb. 14, 2012

(54) POWER MANAGEMENT METHOD FOR HANDHELD ELECTRONIC DEVICE USING G-SENSOR

(75) Inventor: Cheng-Hao Chin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 874 days.

(21) Appl. No.: 12/146,455

(22) Filed: Jun. 26, 2008

(65) Prior Publication Data

US 2009/0138736 A1 May 28, 2009

(30) Foreign Application Priority Data

Nov. 27, 2007 (TW) ................................ 96144990 A

(51) Int. Cl.
*G06F 1/32* (2006.01)
(52) U.S. Cl. ......................................... 713/320; 713/300
(58) Field of Classification Search .................. 713/300, 713/320
See application file for complete search history.

(56) References Cited

U.S. PATENT DOCUMENTS

| 6,408,178 B1 | 6/2002 | Wickstrom et al. | |
| 6,466,198 B1 * | 10/2002 | Feinstein | 345/158 |
| 7,386,748 B2 * | 6/2008 | Andou | 713/330 |
| 7,436,364 B2 * | 10/2008 | Nishikido et al. | 343/702 |
| 2002/0021278 A1 | 2/2002 | Hinckley et al. | |
| 2004/0133817 A1 * | 7/2004 | Choi | 713/300 |
| 2006/0240866 A1 | 10/2006 | Eilts | |

FOREIGN PATENT DOCUMENTS

| JP | 2007-281864 | 10/2007 |
| TW | 200535753 | 11/2005 |
| WO | 2006057770 | 6/2006 |
| WO | 2008075082 | 6/2008 |

OTHER PUBLICATIONS

"Partial Search Report of European counterpart application", issued on Sep. 17, 2009, p.1-p.5.

* cited by examiner

*Primary Examiner* — Nitin Patel
(74) *Attorney, Agent, or Firm* — Jianq Chyun IP Office

(57) ABSTRACT

A power management method for a handheld electronic device is provided. In the present method, a G-sensor is used for detecting a normal vector of a plane of the handheld electronic device. The normal vector is then determined whether being directed toward a downward direction. When the normal vector is determined as being directed toward the downward. Accordingly, the handheld electronic device can be controlled to enter the power saving mode timely according to the positioned state of the device without going through complicated procedures such as operating a menu, so as to provide a more intuitive and convenient way for power management.

9 Claims, 4 Drawing Sheets

(a)

(b)

POWER MANAGEMENT METHOD FOR HANDHELD ELECTRONIC DEVICE USING G-SENSOR

CROSS-REFERENCE TO RELATED APPLICATION

This application claims the priority benefit of Taiwan application Ser. No. 96144990, filed on Nov. 27, 2007. The entirety of the above-mentioned patent application is hereby incorporated by reference herein and made a part of this specification.

BACKGROUND OF THE INVENTION

1. Field of the Invention

The present invention relates to a power management method, and in particular, to a power management method using a G-sensor.

2. Description of Related Art

Along with the continuous development of the technology, handheld electronic devices such as a mobile phone, a personal digital assistant (PDA), and a note book have integrated a greater number of functions. Besides functions such as making calls, sending/receiving messages, and making notes, surfing the Internet and receiving/sending e-mails also have become basic functions of the handheld electronic devices in the current market. Multiple functions not only can facilitate people's life but also can provide entertainments, and thus the handheld electronic devices have become one of the most popular high-tech electronic products in the current market.

Generally, the handheld electronic devices are intended for use in the outdoors. Under such a circumstance where there is no external power supply available to the handheld electronic device, the only power source available to the handheld electronic device is the battery installed in the device. Accordingly, power management is one of the most important issues for the handheld electronic devices. How to control the handheld electronic devices to enter a power saving mode timely according to the users' usage condition for improving the efficiency of the battery and for extending the lifetime of the battery is crucial for the power management.

In terms of the power saving function of the handheld electronic device in the current market, the user has to set up a predetermined period of time on their own. The handheld electronic device enters the power saving mode only when the user has not operated the handheld electronic device for more than the predetermined time. The above-mentioned method controls the handheld electronic device to enter the power saving mode after the handheld electronic device operates in a normal operating mode for a period of time, so quite some power is wasted. Moreover, in addition to the above mentioned method for setting up the predetermined period of time, the user can also control the handheld electronic device to enter the power saving mode by selecting the power saving function from layered menus when the user wants to stop using the handheld electronic device. However, not only the manual control method wastes time, but the operating procedures are complicated, so that the user often feels troublesome and would rather not to use the power saving function. Therefore, the effect of power saving can not be carried out eventually.

SUMMARY OF THE INVENTION

In light of the above, the present invention provides a power management method for a handheld electronic device, in which a G-sensor is used for detecting an inclined status of the handheld electronic device, so as to determine whether a power saving mode should be entered for saving electric power.

In order to achieve the above-mentioned or other objects, the present invention provides a power management method for the handheld electronic device. A G-sensor is used for detecting a normal vector of a plane of the handheld electronic device and then the normal vector is determined whether being directed toward a downward direction. If the normal vector is directed toward the downward direction, then the handheld electronic device is controlled to enter a power saving mode.

According to the present invention, the plane of the above-mentioned handheld electronic device preferably is the plane including a screen of the handheld electronic device when the handheld electronic device is laid horizontally.

According to the present invention, the normal vector preferably includes an x component, a y component, and a z component. The step of determining whether the normal vector is directed toward the downward direction includes determining whether the z component of the normal vector is negative, and the x component and y component fall within a specific range respectively. The normal vector is determined as being directed toward the downward direction when the z component of the normal vector is negative and the x component and y component fall within the specific range.

After the step of determining whether the normal vector is directed toward the downward direction, the present invention preferably includes determining whether the normal vector is directed to the downward direction for more than a first time period. The handheld electronic device is controlled to enter the power saving mode when the normal vector is directed to the downward direction for more than the first time period.

According to the present invention, preferably, the above-mentioned method further includes continuing to detect the normal vector of the plane of the handheld electronic device and determining whether the normal vector deviates from the downward direction. The handheld electronic device is controlled to resume a normal operating mode when the normal vector deviates from the downward direction.

After the step of determining whether the normal vector deviates from the downward direction, preferably, the present invention further includes determining whether the normal vector deviates from the downward direction for more than a second time period. The handheld electronic device is controlled to resume the normal operating mode when the normal vector deviates from the downward direction for more than the second time period.

According to the present invention, preferably, the handheld electronic device entering the power saving mode is controlled by an operating system of the handheld device, and the handheld electronic device resuming the normal operating mode is controlled by an embedded controller of the handheld electronic device.

According to the present invention, the power saving mode includes a sleep mode, a hibernate mode, a silent mode, or a mute mode. The above-mentioned handheld electronic device includes a mobile phone, a smart phone, a personal digital assistance (PDA) phone, or an ultra-mobile personal computer (UMPC).

According to the present invention, the G-sensor is used to detect the value of the normal vector of the front plane of the handheld electronic device. The value of the normal vector is then used to determine whether the front plane of the handheld electronic device is directed toward the downward direction, so as to control the handheld electronic device to enter the power saving mode without going through the complicated operating procedures such as selecting menus, and thereby a more intuitive and convenient way for power management is provided.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Usually, when an user operates a handheld electronic device equipped with a screen, such as a vertical type (bar type) handheld electronic device or a glide-open type (sliding type) handheld electronic device, a front plane (i.e. the plane having a screen) is placed upwards. When the user stop operating the device, and place it on a table or other objects, the user often places the front plane of the device upwards. When the user does not want others to see the content on the screen or does not want to use the device, the user can place the front plane of the device downward. Furthermore, if the device is a flip-open type (clam shall type) handheld electronic device, the user may also place an upper lid having the screen upwards or inclined upwardly when the device is in use. When the user does not want to use the device, he/she may place the upper lid having the screen downward or close it to prevent others from seeing the content on the screen.

Accordingly, when the front plane of the device or the upper lid having the screen is placed downward, it almost represents that the user wants to stop using the device. At this moment, if the device can be controlled to enter a power saving mode timely, unnecessary power waste can be reduced and a stand-by time of the handheld electronic device can be increased. The present invention provides a power management method for a handheld electronic device, which is developed from the above-mentioned concept. In order to make the present invention more comprehensible, embodiments are described below as the examples to prove that the invention can actually be realized.

Figure 1:
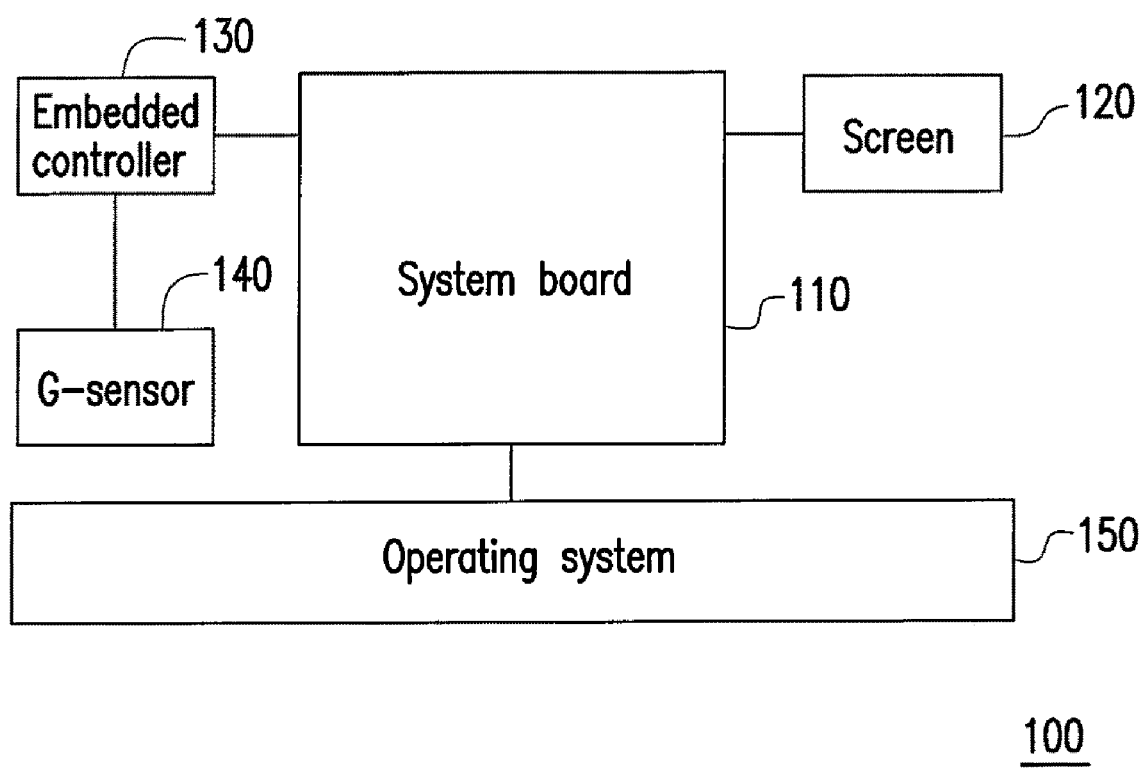
FIG. 1 is a block diagram of a handheld electronic device according to one embodiment of the present invention.

FIG. 1 is a block diagram of the handheld electronic device according to one embodiment of the present invention. Referring to FIG. 1, the handheld electronic device 100 of the present invention includes a system board 110, a screen 120, an embedded controller 130, a G-sensor 140, and an operating system 150. The handheld electronic device 100 includes, for example, a mobile phone, a smart phone, a touch phone, a PDA phone, or an ultra-mobile PC (UMPC), and the scope of types of the handheld electronic device 100 has no limitation.

Figure 2:
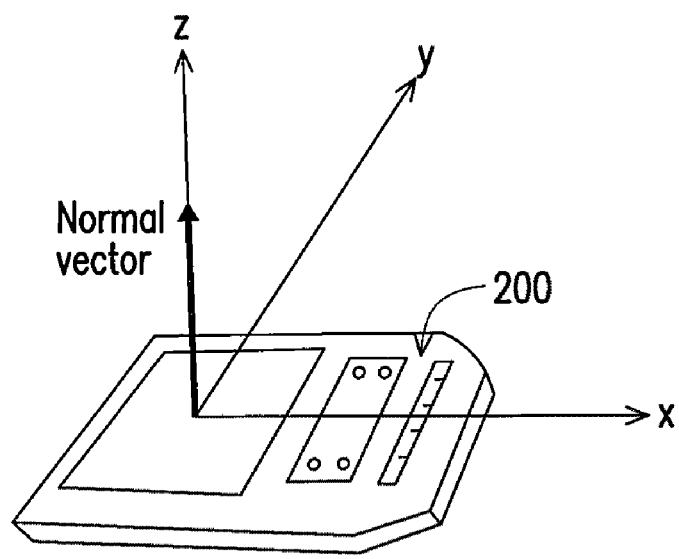
FIG. 2 is schematic view illustrating a normal vector of a plane of the handheld electronic device according to one embodiment of the present invention.
Figure 2:
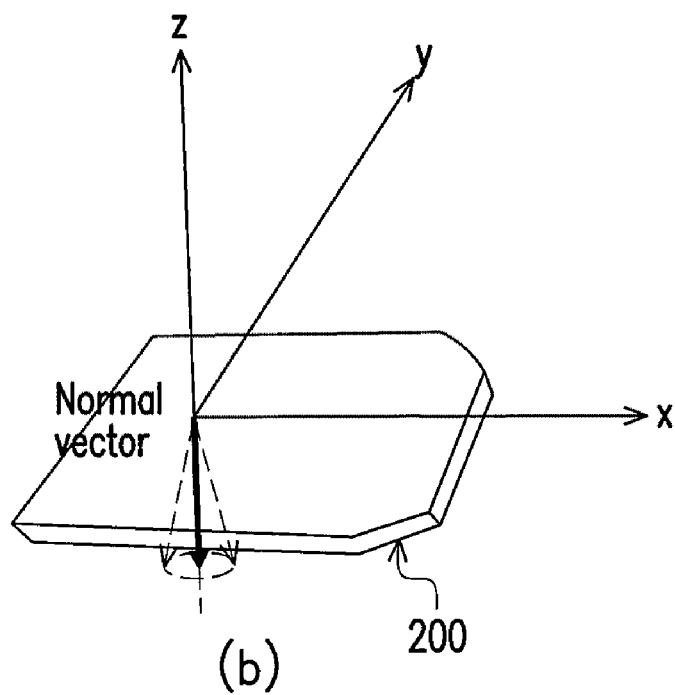

According to the embodiment of the present invention, the G-sensor 140 is disposed in the handheld electronic device 100 for detecting a normal vector of a plane of the handheld electronic device 100. The plane includes, for example, the screen of the handheld electronic device when the handheld electronic device is laid horizontally, or the plane includes an upper lid having the screen of the handheld electronic device when a flip-open type handheld electronic device is in use. FIG. 2 is schematic view illustrating the normal vector of the plane of the handheld electronic device according to one embodiment of the present invention. Referring to FIG. 2(a), which illustrates the status when a front plane of the handheld electronic device is placed upwards, a plane 200 is a plane having the screen and the normal vector is vertical to the plane 200 and has a component in a Z-axis direction. Referring to FIG. 2(b), which illustrates the status when the front plane of the handheld electronic device is placed downward, the plane 200 is a plane having the screen and the normal vector is vertical to the plane 200 and has a component opposite to the Z-axis direction.

The detected value of the normal vector is transmitted to the operating system 150 through the embedded controller 130 and then is analyzed by the operating system 150, so as to determine whether the handheld electronic device should enter the power saving mode. In detail, the handheld electronic device is controlled to enter the power saving mode, and power saving functions such as switching off the screen 120, switching off the speaker (not shown in the figures), switching the handheld electronic device 100 to silent mode, and muting the ring of an incoming call are carried out when the operating system 150 determines that the normal vector is directed toward the downward direction. Otherwise, the handheld electronic device maintains the normal operating mode.

When the handheld electronic device 100 enters the power saving mode, the embedded controller 130 takes charge of the control of the handheld electronic device 100, and the G-sensor 140 continues to detect the normal vector of the plane of the handheld electronic device 100. When the normal vector deviates from the downward direction, the embedded controller 130 controls the handheld electronic device to resume the normal operating mode and returns the control of the handheld electronic device back to the operating system 150, so that the users can operate the handheld electronic device. Another embodiment is exemplified hereinafter to describe the detailed steps of the power management method of the handheld electronic device 100.

Figure 3:
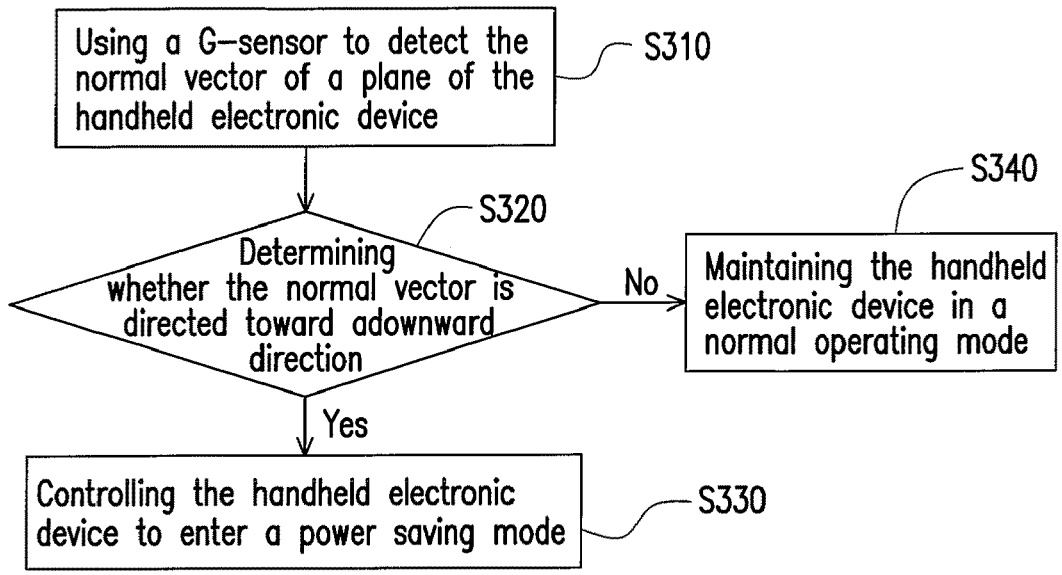
FIG. 3 is a flowchart illustrating a power management method for the handheld electronic device according to one embodiment of the present invention.

FIG. 3 is a flowchart illustrating the power management method for the handheld electronic device according to one embodiment of the present invention. Referring to FIG. 3, the present embodiment can be applied to the handheld electronic device 100 of the above-mentioned embodiments in order to control the handheld electronic device to enter to the power saving mode timely when the front plane of the handheld electronic device or the upper lid having the screen is determined as being directed toward the downward direction. The steps of the present embodiment are as follows.

In a step S310, a G-sensor is used for detecting the normal vector of a plane of the handheld electronic device. The plane (as the plane 200 shown in FIG. 2) includes the screen of the handheld electronic device when the handheld electronic device is laid horizontally. The normal vector is then transmitted to the operating system through the embedded controller and the system board for performing the subsequent analyses and processes.

In a step S320, whether the normal vector is directed toward a downward direction is determined by the operating system. In detail, the normal vector of the plane of the handheld electronic device includes an x component, a y component, and a z component. When the handheld electronic device is laid horizontally, the x component and the y component are 0. Accordingly, whether the normal vector is directed toward the downward direction or an upward direction can be determined according to the value of the z component. When the operating system determines that the value of the z component is negative, the normal vector can be determined as being directed toward the downward direction.

Accordingly, in a step S330, the operating system further controls the handheld electronic device to enter the power saving mode when the normal vector is determined as being directed toward the downward direction. On the contrary, the handheld electronic device maintains the normal operating mode in a step S340 when it is determined that the normal vector is not directed toward the downward direction. The above-mentioned power saving mode includes a sleep mode, a hibernate mode, a silent mode, or a mute mode. The power saving mode can be designed according to different demands of the users, and therefore the scope of the power saving mode is not limited by the present embodiment.

In light of the above, according to the value of the normal vector detected by the G-sensor, whether the handheld electronic device or the upper lid having the screen is directed toward the downward direction can be determined easily, so that the handheld electronic device can be controlled to enter to the power saving mode timely and power consumption can be reduced. It should be noted that the result of determining the direction of the normal vector of the handheld electronic device can vary with different angles at which the handheld electronic device is placed or can vary with variances in angle when the users carry the device around. The present invention provides solutions for the above-mentioned situations, and one embodiment is exemplified hereinafter for each of the above-mentioned solutions.

Figure 4:
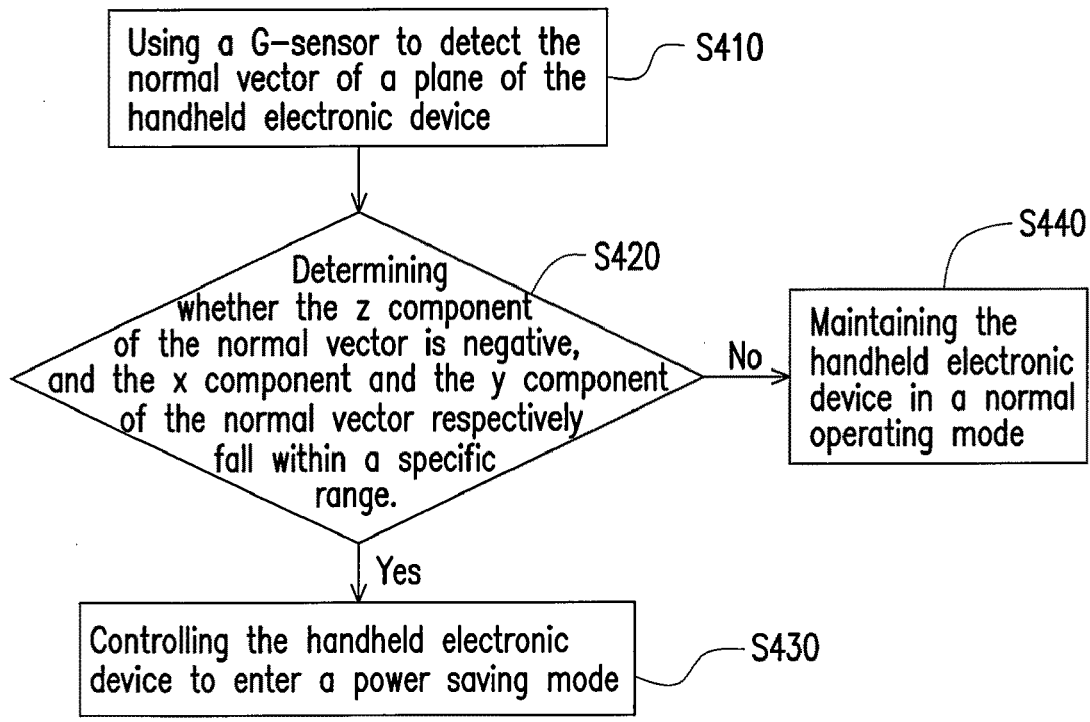
FIG. 4 is a flowchart illustrating the power management method for the handheld electronic device according to one embodiment of the present invention.

FIG. 4 is a flowchart illustrating the power management method for the handheld electronic device according to one embodiment of the present invention. Referring to FIG. 4, the present embodiment can be applied to the handheld electronic device 100 of the above-mentioned embodiments in order to control the handheld electronic device to enter the power saving mode timely when the front plane of the handheld electronic device or the upper lid having the screen is determined as being directed toward the downward direction. The difference between the above-mentioned embodiment and the present embodiment is that the present embodiment provides a buffering range to allow the handheld electronic device to achieve the same power saving effect when the normal vector of the front plane of the handheld electronic device is not exactly directed toward the vertically downward direction. The steps of the present embodiment are as follows.

First, in a step S410, a G-sensor is used for detecting the normal vector of a plane of the handheld electronic device, wherein the plane includes the screen of the handheld electronic device when the handheld electronic device is laid horizontally. The normal vector is then transmitted to the operating system through the embedded controller and the system board for performing the subsequent analyses and processes.

Then, whether the normal vector is directed toward the downward direction is determined by the operating system. In detail, the normal vector of the handheld electronic device includes an x component, a y component, and a z component. The normal vector is determined as being directed toward the downward direction when the x component, y component are 0 and when the z component is negative. However, because of the users' different habits of placing objects and different environments in which the objects are placed, the front plane of the device is not always exactly placed toward the vertically downward direction. Accordingly, the normal vector of the front plane may include the x component or the y component (i.e. the x component and the y component may not be 0). Therefore, in a step S420, in addition to determining whether the z component of the normal vector is negative, whether the x component and the y component respectively fall within a specific range is determined.

In a step S430, when the z component of the normal vector is negative, and the x component and y component fall within the specific range, the normal vector is determined as being directed toward the downward direction, and the operating system further controls the handheld electronic device to enter the power saving mode. On the contrary, in a step S440, when the z component of the normal vector is not negative, or the x component or the y component does not fall within the specific range, the handheld electronic device maintains the normal operating mode.

For example, referring to FIG. 2(b), a specific range indicated by dotted lines is provided for the normal vector. When the normal vector falls within the specific range, the normal vector is determined as being directed toward the downward direction, and thereby the handheld electronic device is controlled to enter the power saving mode.

For example, when the flip-open type handheld electronic device is in use, if the upper lid having the screen is slightly inclined to the downward direction, the flip-open type handheld electronic device is not controlled to enter the power saving mode because the normal vector does not fall within the specific range.

By using the above-mentioned method, even when the front plane of the device slightly deviates from the vertically downward direction, it can be determined that the user wants to stop using the device. Therefore, the device is controlled to enter the power saving mode.

In addition, the present invention provides a buffering time to determine that the users really want the device to enter the power saving node instead of placing the front plane of the device downward unknowingly. One embodiment is described in detail hereinafter.

Figure 5:
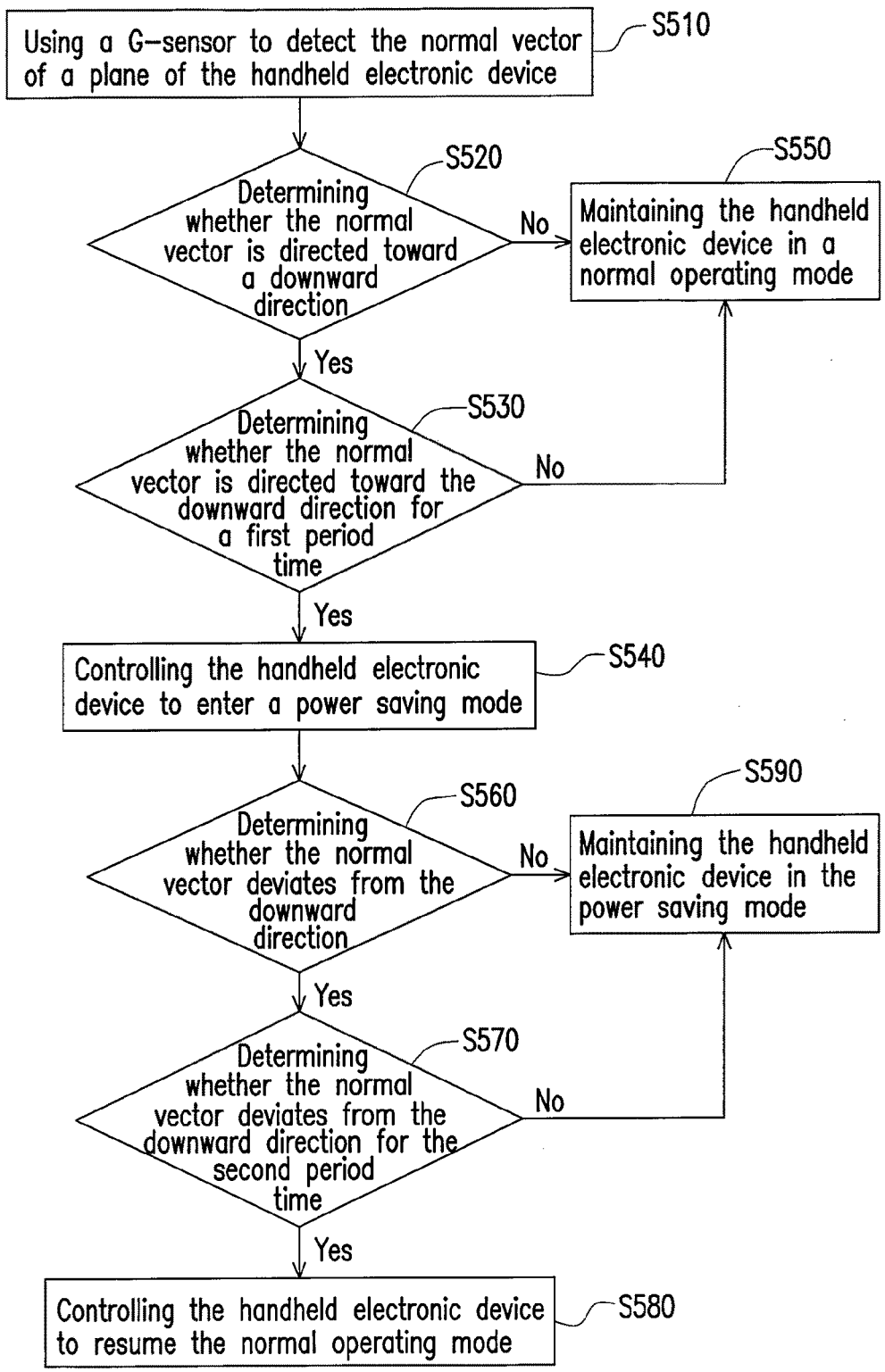
FIG. 5 is a flowchart illustrating the power management method for the handheld electronic device according to one embodiment of the present invention.

FIG. 5 is a flowchart illustrating the power management method for the handheld electronic device according to one embodiment of the present invention. Referring to FIG. 5, the present embodiment can be applied to the handheld electronic device 100 of the above-mentioned embodiments in order to control the handheld electronic device to enter to the power saving mode timely when the front plane of the handheld electronic device is determined as being directed toward the downward direction. The difference between the present embodiment and the above-mentioned embodiments is that the present embodiment provides a buffering time, so that only after it is determined that the front plane of the handheld electronic device has been directed toward the downward direction for a period of time, the status that the users would like to switch off the device temporarily can be determined. Accordingly, the device is controlled to enter the power saving mode.

In a step S510, a G-sensor is used for detecting the normal vector of a plane of the handheld electronic device. The plane includes the screen of the handheld electronic device when the handheld electronic device is laid horizontally. The normal vector is then transmitted to the operating system through the embedded controller and the system board for performing the subsequent analyses and processes.

In a step S520, whether the normal vector is directed toward the downward direction is determined by the operating system. The detailed step of determining whether the normal vector is directed toward the downward direction is the same as or similar to those of the above-mentioned embodiments, so is not repeated herein.

When the normal vector is determined as being directed toward the downward direction, whether the normal vector is directed toward the downward direction for a first time period is further determined in a step S530. In a step S540, when the normal vector is directed toward the downward direction and lasts for more than the first time period, the handheld electronic device is controlled to enter the power saving mode. On the contrary, in a step S550, when the normal vector deviates from the downward direction before the time period, the handheld electronic device is not controlled to enter the power saving mode and the handheld electronic device still maintains the normal operating mode.

It should be noted that the present embodiment further includes steps of switching on the device when the user wants to use the device again after the device enters the power saving mode. When the device enters the power saving mode, the embedded controller takes charge of the device. At this moment, the G-sensor of the device continues to detect the normal vector of the plane of the handheld electronic device. In a step S560, the value of the normal vector is transmitted to the embedded controller to determine whether the normal vector deviates from the downward direction. In a step S570, the embedded controller further determines whether the normal vector deviates from the downward direction for more than the second time period. In a step S580, when the normal vector deviates from the downward direction for more than the second time period, the embedded controller controls the handheld electronic device to resume the normal operating mode. Furthermore, in a step S590, the handheld electronic device maintains the power saving mode if it is determined that the normal vector does not deviate from the downward direction or the normal vector does not deviate from the downward direction for more than the second time period.

In summary, in the present invention, according to the angle in which the device is placed, the power management method for the handheld electronic device determines whether the handheld electronic device should enter the power saving mode. When the front plane of the handheld electronic device is placed toward the downward direction, it is determined that the user does not want to use the device temporarily, so that the device is controlled to enter the power saving mode for reducing power consumption. On the contrary, when the front plane of the handheld electronic device deviates from the downward direction, it is determined that the user wants to use the device again, so that the device is controlled to resume the normal operating mode. Thereby, a more intuitive and convenient way for power management is provided.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A power management method for a handheld electronic device, comprising:
   using a G-sensor for detecting a normal vector of a plane which is a screen of the handheld electronic device comprising a verticle type or a glide open type handheld electronic device;
   determining whether the normal vector comprising an x, y, or z component is directed toward a downward direction by determining whether the z component of the normal vector is negative, and the x component and the y component of the normal vector fall within a specific range respectively; and the normal vector is determined to be directed toward the downward direction when the z component of the normal vector is negative and the x component and the y component of the normal vector fall within the specific range; and
   controlling the handheld electronic device to enter a power saving mode if the normal vector of a plane which is a screen of the handheld electronic device is directed toward the downward direction.

2. The method according to claim 1, wherein the step of determining whether the normal vector is directed toward the downward direction comprises:
   determining whether the z component of the normal vector is negative and the x component and the y component of the normal vector are 0; and
   determining the normal vector is directed toward the downward direction when the z component of the normal vector is negative and the x component and the y component of the normal vector are 0.

3. The method according to claim 1, after determining the normal vector is directed toward the downward direction, further comprising:
   determining whether the normal vector is directed toward the downward direction for more than a first time period; and
   controlling the handheld electronic device to enter the power saving mode when the normal vector is directed toward the downward direction for more than the first time period.

4. The method according to claim 1, further comprising:
   continuing to detect the normal vector of the plane of the handheld electronic device;
   determining whether the normal vector deviates from the downward direction; and
   controlling the handheld electronic device to resume a normal operating mode when the normal vector deviates from the downward direction.

5. The method according to claim 4, after determining the normal vector deviates from the downward direction, further comprising:
   determining whether the normal vector deviates from the downward direction for more than a second time period; and
   controlling the handheld electronic device to resume the normal operating mode when the normal vector deviates from the downward direction for more than the second time period.

6. The method according to claim 4, wherein an operating system of the handheld device controls the handheld electronic device to enter the power saving mode, and an embedded controller of the handheld electronic device controls the handheld electronic device to resume the normal operating mode.

7. The method according to claim 1, wherein the power saving mode comprises a sleep mode, a hibernate mode, a silent mode, or a mute mode.

8. The method according to claim 1, wherein the power saving mode comprises the functions of switching off the screen, switching off the speaker, switching the handheld electronic device to silent mode, or muting the ring of an incoming call.

9. The method according to claim 1, wherein the handheld electronic device comprises a mobile phone, a smart phone, a touch phone, a personal digital assistant (PDA) phone, or an ultra-mobile personal computer (UMPC).

* * * * *